(12) United States Patent
Dulko et al.

(10) Patent No.: US 10,947,124 B2
(45) Date of Patent: Mar. 16, 2021

(54) CONCENTRATED AQUEOUS SOLUTIONS OF ALUMINUM CHLOROHYDRATE MONOHYDRATE

(71) Applicant: USALCO, LLC, Baltimore, MD (US)

(72) Inventors: James M. Dulko, Pasadena, MD (US); Bruce Wonder, Abingdon, MD (US)

(73) Assignee: USALCO, LLC, Baltimore, MD (US)

( * ) Notice: Subject to any disclaimer, the term of this patent is extended or adjusted under 35 U.S.C. 154(b) by 164 days.

(21) Appl. No.: 15/977,387

(22) Filed: May 11, 2018

(65) Prior Publication Data
US 2018/0290895 A1    Oct. 11, 2018

Related U.S. Application Data

(63) Continuation-in-part of application No. 14/852,458, filed on Sep. 11, 2015, now Pat. No. 10,040,072.
(Continued)

(51) Int. Cl.
*C01F 7/56* (2006.01)
*C02F 1/68* (2006.01)
(Continued)

(52) U.S. Cl.
CPC ............ *C01F 7/56* (2013.01); *C01P 2002/86* (2013.01); *C01P 2006/22* (2013.01);
(Continued)

(58) Field of Classification Search
CPC ....... C01F 7/56; C01F 7/58; C08K 2003/2227
(Continued)

(56) References Cited

U.S. PATENT DOCUMENTS

| 2,470,315 A | 5/1949 | McGehee | ........................ 241/54 |
| 2,671,009 A | 3/1954 | Comstock | ........................ 23/90 |

(Continued)

FOREIGN PATENT DOCUMENTS

| CN | 102607248 A | 7/2012 | .............. F26B 17/10 |
| DE | 273824 A1 | 11/1989 | ................ C01F 7/30 |

(Continued)

OTHER PUBLICATIONS

Arvaniti et al., "Determination of particle size, surface area, and shape of supplementary cementitious materials by different techniques," Material and Structures, 15 pages, Oct. 4, 2014.
(Continued)

*Primary Examiner* — Hoa (Holly) Le
(74) *Attorney, Agent, or Firm* — Sunstein LLP

(57) ABSTRACT

A system and method for producing commercial strength solutions of aluminum chlorohydrate are provided. The method includes providing aluminum chlorohydrate monohydrate (ACHMH) powder, heating water to at least 120° F. and less than 200° F., and dissolving at least a portion of the ACHMH powder into the heated water to form the solution of aluminum chlorohydrate. The produced solution of aluminum chlorohydrate from the ACHMH powder has an aluminum oxide concentration ranging from about 18 wt % to about 27 wt %, has a basicity ranging from greater than 74% and less than 83%, and has a freezing point ranging from about 10° F. to about 16° F. The solution may also have an iron content of between about 0 to about 70 ppm as Fe.

18 Claims, 7 Drawing Sheets

Related U.S. Application Data

(60) Provisional application No. 62/550,303, filed on Aug. 25, 2017, provisional application No. 62/505,724, filed on May 12, 2017, provisional application No. 62/049,457, filed on Sep. 12, 2014.

(51) Int. Cl.
*C02F 1/52* (2006.01)
*C08K 3/22* (2006.01)

(52) U.S. Cl.
CPC ...... *C01P 2006/34* (2013.01); *C01P 2006/80* (2013.01); *C02F 1/5236* (2013.01); *C02F 1/68* (2013.01); *C08K 2003/2227* (2013.01)

(58) Field of Classification Search
USPC .......................................................... 423/111
See application file for complete search history.

(56) References Cited

U.S. PATENT DOCUMENTS

| | | | |
|---|---|---|---|
| 3,462,086 A | 8/1969 | Bertrand et al. | 241/5 |
| 3,876,758 A | 4/1975 | Beekman | 424/47 |
| 3,878,293 A | 4/1975 | Piccolo et al. | 423/495 |
| 3,891,745 A | 6/1975 | Bellan et al. | 423/462 |
| 3,953,584 A | 4/1976 | Danner et al. | 423/462 |
| 4,029,750 A | 6/1977 | Schoener et al. | 423/495 |
| 4,090,916 A | 5/1978 | Papafingos et al. | 159/9 A |
| 4,203,812 A | 5/1980 | Bergner et al. | 204/94 |
| 4,259,311 A | 3/1981 | Shah | 423/625 |
| 4,390,131 A | 6/1983 | Pickrel | 241/1 |
| 5,167,372 A | 12/1992 | Poggie et al. | 241/23 |
| 5,202,115 A * | 4/1993 | Vincenti | A61K 8/19 423/625 |
| 5,573,582 A | 11/1996 | Inui et al. | 106/287.17 |
| 5,985,234 A | 11/1999 | Dulko | 423/467 |
| 5,997,838 A | 12/1999 | Dulko | 423/462 |
| 6,036,935 A | 3/2000 | Dulko | 423/462 |
| 6,145,765 A | 11/2000 | Capelle, Jr. et al. | 241/5 |
| 6,152,974 A | 11/2000 | Delpiano et al. | 44/593 |
| 9,611,155 B2 | 4/2017 | Dulko | C02F 1/5236 |
| 9,878,918 B2 | 1/2018 | Wonder | C01F 7/56 |
| 9,878,929 B2 * | 1/2018 | Dulko | B01D 21/01 |
| 10,040,072 B2 | 8/2018 | Wonder | B03B 5/56 |
| 10,450,209 B2 * | 10/2019 | Dulko | B01D 21/01 |
| 2004/0040178 A1 | 3/2004 | Coles et al. | 34/591 |
| 2007/0187256 A1 * | 8/2007 | Pratt | A61Q 15/00 205/508 |
| 2008/0181840 A1 | 7/2008 | Steelhammer et al. | 423/495 |
| 2014/0007455 A1 | 1/2014 | Backlund | 34/386 |
| 2015/0021514 A1 | 1/2015 | Dulko | 252/175 |
| 2016/0074873 A1 | 3/2016 | Wonder | B03B 5/56 |

FOREIGN PATENT DOCUMENTS

| | | | | |
|---|---|---|---|---|
| EP | 0530598 A1 | 3/1993 | | C01F 7/56 |
| GB | 576557 A | 4/1946 | | |
| GB | 1266328 A | 3/1972 | | B02C 21/00 |
| GB | 1568831 | 6/1980 | | C01F 7/48 |
| WO | WO 90/08738 A1 | 8/1990 | | C01F 7/56 |
| WO | WO 01/97768 A2 | 12/2001 | | A61K 7/34 |
| WO | WO 2007/082122 | 7/2007 | | |

OTHER PUBLICATIONS

Frias et al., "Determination of Specific Surface Area by the Laser Diffraction Technique. Comparison with the Blaine Permeability Method," Cement and Concrete Research, vol. 21, No. 5, pp. 709-717, 1991.
Harrigan, "Measuring Cement Particle Size and Surface Area by Laser Diffraction," Research Results Digest 382, National Cooperative Highway Research Program, Transportation Research Board of the National Academies, 24 pages, Apr. 2013.
Horiba Instruments, Inc., A Guidebook to Particle Size Analysis, Horiba Scientific, 32 pages, 2012.
ISO, Particle size analysis—Laser diffraction methods, International Standard, ISO 13320, 57 pages, 2009.
Malvern Instruments Limited, A basic guide to particle characterization, Whitepaper, Malvern, 24 pages, 2015.
Malvern Instruments Limited, Mastersizer 3000, User Manual, Malvern, MAN0474-06-EN-00, 196 pages, Jun. 2015.
Malvern Instruments Limited, Mastersizer 3000, Smarter Particle Sizing, Malvern, 20 pages.
Tzoupanos et al., "Coagulation-flocculation processes in water/wastewater treatment: the application of new generation of chemical reagents," $6^{th}$ IASME/WSEAS International Conference on Heat Transfer, Thermal Engineering and Environment, Rhodes, Greece, pp. 309-317, Aug. 20-22, 2008.
Yang et al., Characteristics of High-purity Polyaluminum Chloride Species Prepared by Homogenous Alkalization, Natural Science Journal of Xiangtan University, vol. 27, No. 4, pp. 68-72, Jan. 1, 2005 (In Chinese).
Yang et al., Characteristics of High-purity Polyaluminum Chloride Species Prepared by Homogenous Alkalization, Natural Science Journal of Xiangtan University, vol. 27, No. 4, 4 pages, 2005 (English Abstract).
International Searching Authority, International Search Report—International Application No. PCT/US2015/049839, dated May 30, 2016, together with the Written Opinion of the International Searching Authority, 24 pages.
Hartman et al., "Thermal Decomposition of Aluminum Chloride Hexahydrate", Ind. Eng. Chem Res., Jul. 2005, 44, 6591-6598.
Fisher Scientific, Aluminum Chloride Hexahydrate—Description, 2008, 2 pages.
CONTEC, Commercial Brochure, Polyaluminum Chloride, 4 pages, printed in 2016 (Year: 2016).
Park et al., "Bench-scale decomposition of aluminum chloride hexahydrate to produce poly(aluminum chloride)", Ind. Eng. Chem. Res. 2000, 39, 4173-4177 (Year: 2000).
Nair & Narayanan, Microtines disk centrifuge pneumatic classifier for fluid energy-based communication systems:, Adv. Powder Technol., vol. 10, No. 2, 145-157 (1999) (Year: 1999).
International Searching Authority, International Preliminary Report on Patentability—International Application No. PCT/US2015/049839 dated Jan. 30, 2017, 27 pages.
International Searching Authority, International Search Report—International Application No. PCT/US2018/032276 dated Jul. 24, 2018, 14 pages.

* cited by examiner

Solid state $^{27}$Al NMR spectrum of milled

CONCENTRATED AQUEOUS SOLUTIONS OF ALUMINUM CHLOROHYDRATE MONOHYDRATE

CROSS-REFERENCE TO RELATED APPLICATIONS

This patent application claims the benefit of U.S. Provisional Patent Appl. No. 62/505,724 filed May 12, 2017 and U.S. Provisional Patent Appl. No. 62/550,303 filed Aug. 25, 2017, and is also a continuation-in-part of U.S. patent application Ser. No. 14/852,458 filed Sep. 11, 2015, which claims the benefit of U.S. Provisional Patent Appl. No. 62/049,457 filed Sep. 12, 2014, the disclosures of which are incorporated by reference herein in their entirety.

TECHNICAL FIELD

The present invention is directed to aluminum chlorohydrate products, and more particularly, to systems and processes for producing aluminum chlorohydrate products for use in the treatment of water and/or wastewater.

BACKGROUND ART

Commercially available aluminum chlorohydrate (ACH) is produced by digesting aluminum metal in hydrochloric acid, aluminum chloride or basic aluminum chloride solutions. In order to get the aluminum to digest in the acidic chloride solution, the aluminum metal typically contains up to 0.2 wt % iron. The iron acts like a catalyst and speeds up the reaction to form the ACH solution. Thus, the process produces ACH solutions of greater than 150 ppm as Fe. If a lower iron content is desired, extra processing steps are required to remove the iron from the ACH solution. These ACH products are commonly sold as a 50% aluminum chlorohydrate dihydrate (ACHDH) solution. The freezing point of these solutions is typically 19-23° F. Therefore, this product requires additional heating to keep from freezing in much of the country if stored outdoors during winter. These solutions are often spray dried to produce ACHDH in a solid, powder form. ACHDH is readily soluble in cold water and can be easily diluted with water to produce the 50% ACHDH solution. However, these products have problems working as a flocculent during cold water conditions and in certain circumstances do not work in a very efficient manner.

Powder wetting and dispersion systems are common for putting powders into solution. However, when these systems are used to put aluminum chlorohydrate monohydrate into solution using conventional methods, the system becomes filled with gel solids and ceases to operate.

SUMMARY OF THE EMBODIMENTS

In one embodiment, a method of forming a solution of aluminum chlorohydrate includes providing aluminum chlorohydrate monohydrate powder having a composition of $Al_2(OH)_aCl_{(6-a)}$—$XH_2O$, where a=4.4 to 5 and X=0 to 1.7, heating water to at least 120° F. and less than 200° F., and dissolving at least a portion of the aluminum chlorohydrate monohydrate powder into the heated water to form the solution of aluminum chlorohydrate.

In related embodiments, the method further includes dissolving another portion of the aluminum chlorohydrate monohydrate powder into the solution. Dissolving may include agitating the aluminum chlorohydrate monohydrate powder and the heated water until the solution is clear. The method may further include mixing the solution of aluminum chlorohydrate with a second amount of water to form a second solution of aluminum chlorohydrate, heating the second solution to at least 150° F. and less than 200° F., and dissolving an additional amount of the aluminum chlorohydrate monohydrate powder in the second solution. Heating the second solution to at least 150° F. and less than 200° F. may include heating the second amount of water to a temperature sufficiently above 150° F., so that adding the heated second amount of water to the solution of aluminum chlorohydrate causes the temperature of the second solution to be at least 150° F. and less than 200° F. The first solution or the second solution may include an aluminum oxide concentration greater than 24 wt % and less than 27 wt % or greater than 18 wt % and less than 27 wt %. The second solution may have a basicity greater than 74% and less than 83%. The solution may have a freezing point ranging from about 10° F. to about 16° F. The solution may have an iron content of less than 70 ppm as Fe. Products produced by these methods are also disclosed.

In another embodiment, a solution of aluminum chlorohydrate made from chlorohydrate monohydrate powder having a composition of $Al_2(OH)_aCl_{(6-a)}$—$XH_2O$ where a=4.4 to 5 and X=0 to 1.7 includes an aluminum oxide concentration ranging from about 18 wt % to about 27 wt %, a basicity ranging from greater than 74% and less than 83%, and a freezing point ranging from about 10° F. to about 16° F. The aluminum oxide concentration in the solution may range from about 24 wt % to about 27 wt %. The solution may have an iron content of between about 0 to about 70 ppm as Fe.

A mixing system for forming a solution of aluminum chlorohydrate according to the above methods is also provided.

BRIEF DESCRIPTION OF THE DRAWINGS

The foregoing features of embodiments will be more readily understood by reference to the following detailed description, taken with reference to the accompanying drawings, in which.

DETAILED DESCRIPTION OF SPECIFIC EMBODIMENTS

Definitions. As used in this description and the accompanying claims, the following terms shall have the meanings indicated, unless the context otherwise requires:

"Percent Basicity" is defined as (% OH)(52.91)/(% Al). On a molar level, this may be expressed as ((OH)/(Al))/3 multiplied by 100. Thus, $Al_2(OH)_2Cl_4$ has a basicity of 33%.

"UV 254" is absorption of ultraviolet light at 254 nm though a 10 cm cuvette of water.

"Powder wetting and dispersion systems" are commercially available systems that are specifically designed to wet and disperse powders into liquids. Most powder wetting and dispersion systems use induction created by a mixer or pump to suck the powder into the liquid and then shear the mixture to assure uniformity.

A system and method for producing an aluminum chlorohydrate solution from aluminum chlorohydrate monohydrate (ACHMH) powder are described herein according to embodiments of the present invention. Unlike commercially available aluminum chlorohydrate dihydrate (ACHDH), ACHMH powder produced by decomposing aluminum chloride hexahydrate contains 0 to 1.6 moles of hydration. The ACHMH powder may be produced as described in U.S. Pat. Appl. Publ. No. 2016/0074873, which is incorporated by reference herein in its entirety. These ACHMH powders are mostly insoluble in cold water and solutions produced from these ACHMH powders are more efficient as flocculants than commercially available ACH solutions produced by prior art methods. Embodiments of the present invention produce solutions from these ACHMH powders that have a higher chloride content and hence a lower freezing point, and tend to require a somewhat lower basicity than similar solutions produced using ACHDH powder. The ACHMH powders are more economical to produce than the prior art since the process does not require expensive aluminum metal to produce the ACHMH product. In addition, the ACHMH powder weighs less than the produced solution and hence can be more economical than liquid to ship. The powdered ACHMH product can be described as

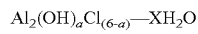

$$Al_2(OH)_aCl_{(6-a)}\cdot XH_2O \qquad (1)$$

Where
a=4.4 to 5, and X=0 to 1.7.

Figure 5:
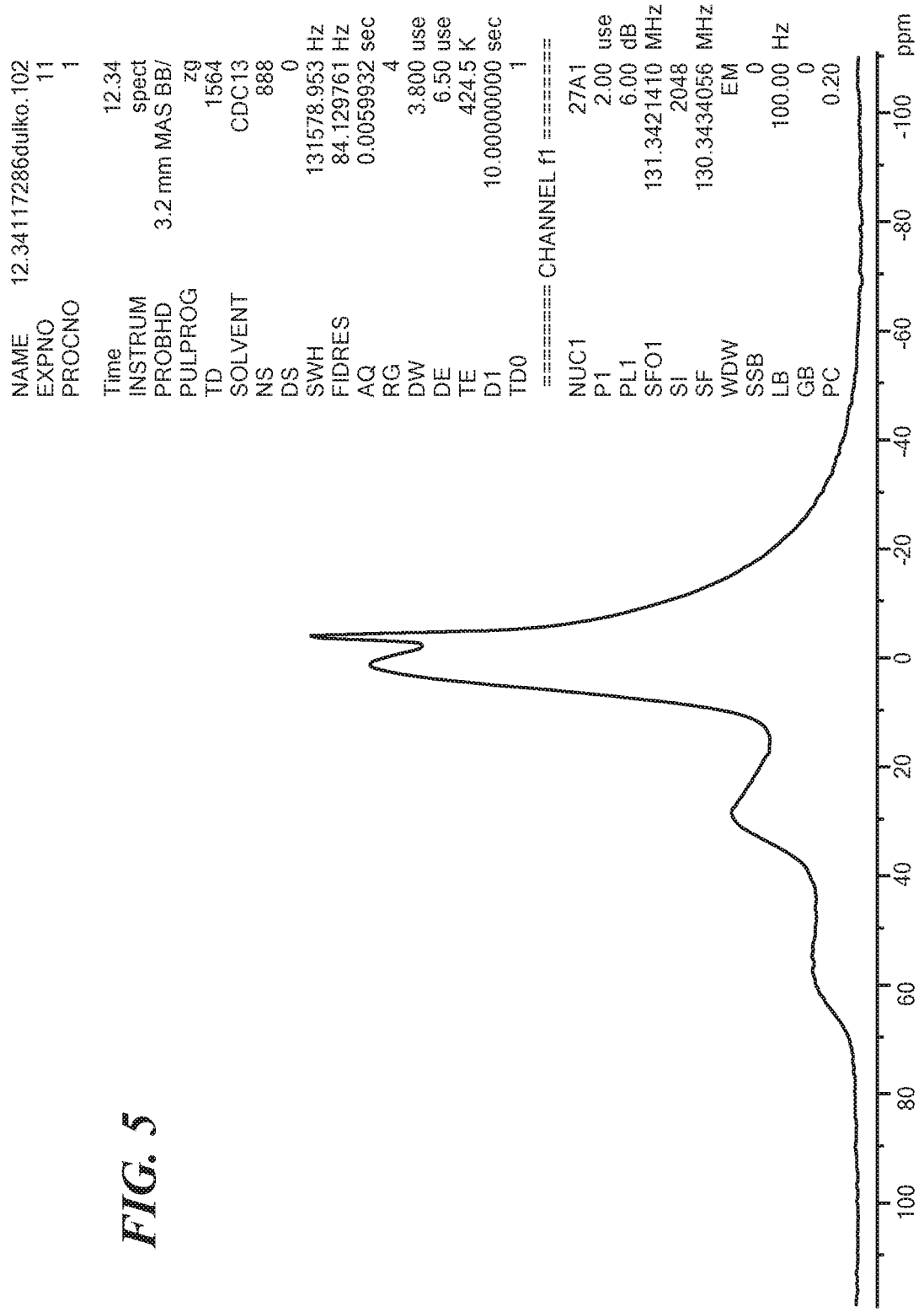
FIG. 5 is a graph of a nuclear magnetic resonance (NMR) spectrum for a powder used to make the Example 7 solution according to embodiments of the present invention.
Figure 6:
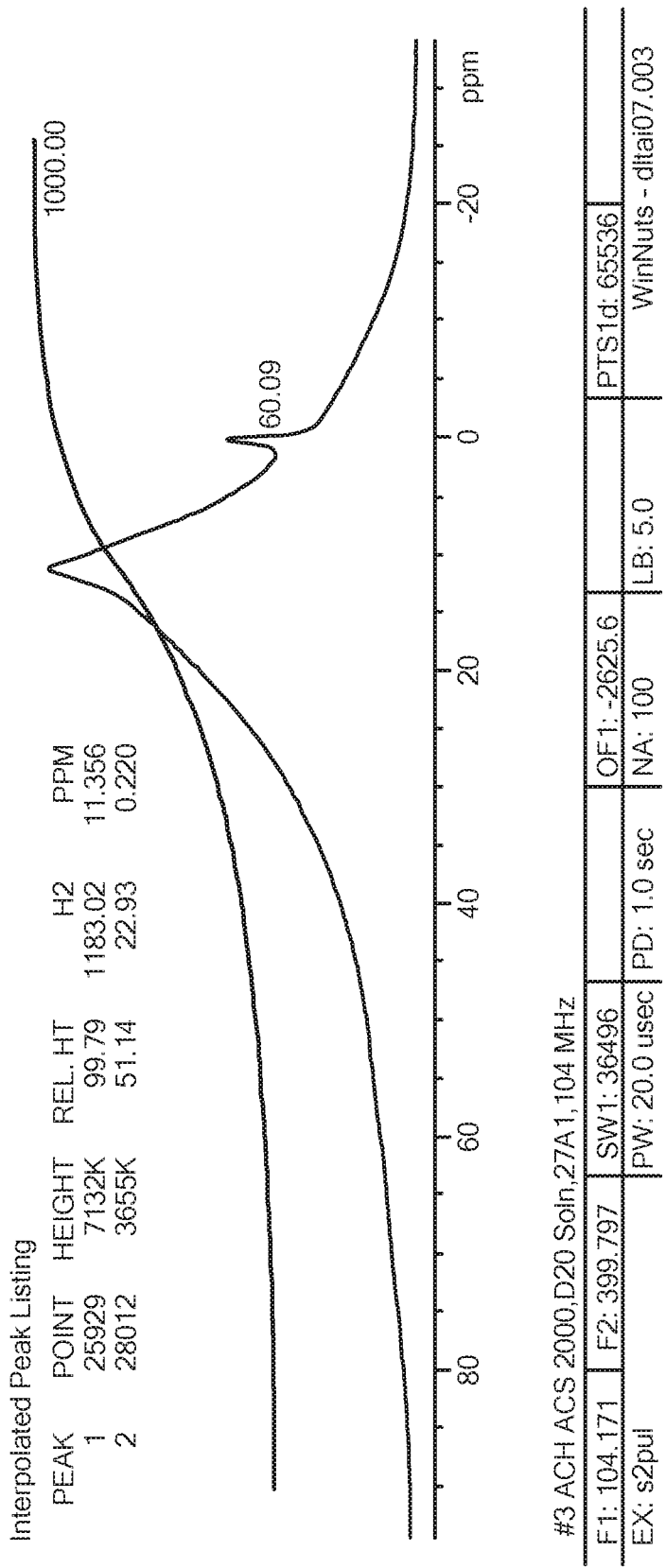
FIGS. 6 and 7 are graphs of NMR spectrums for prior art aluminum chlorohydrate powders.
Figure 7:
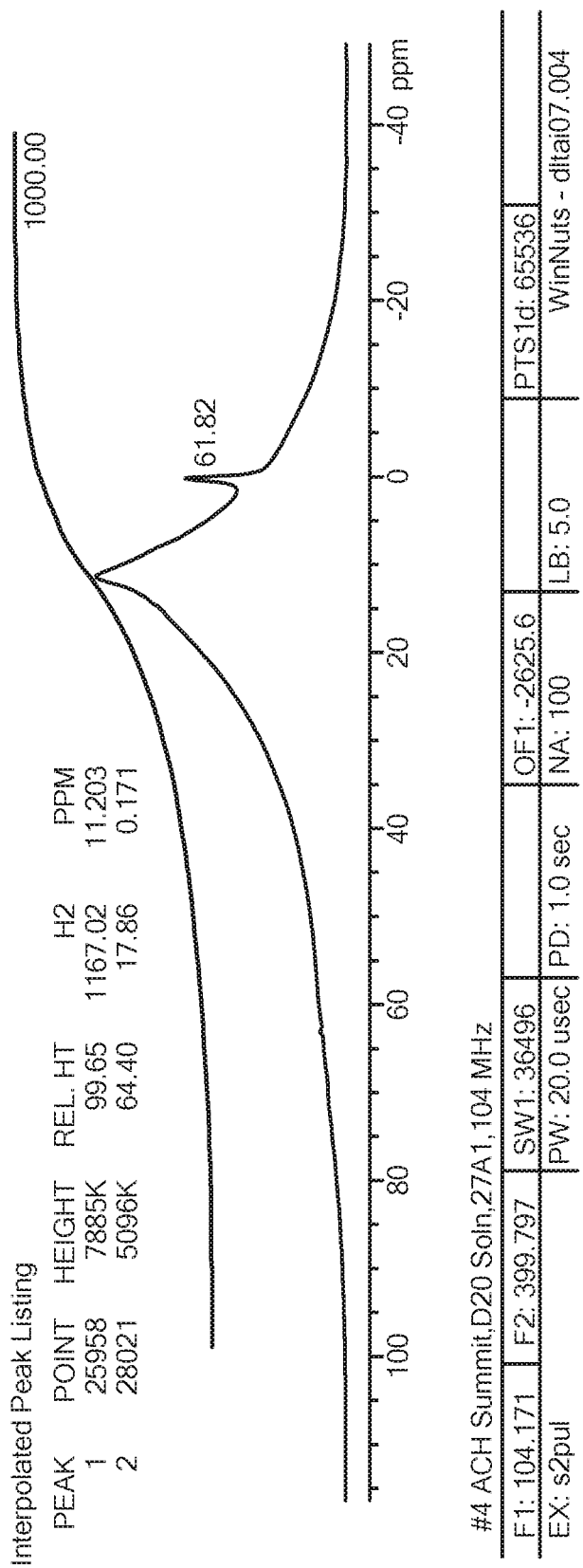

These ACHMH powders are different from ACHDH in that they have significant pentahedral structures when compared to ACH produced by a prior art metal process. The differences can be seen by comparing FIG. 5 to FIGS. 6 and 7. These pentahedral species are more efficient than commercial ACH products at removing impurities from water during flocculation. For example, the solutions of these powders remove more turbidity and organics as measured by UV-254, as shown in FIGS. 1-4. Tables 1-4 (shown below) show the data plotted in FIGS. 1-4, respectively. Solutions of these ACHMH powders can be formulated so that they tolerate freezing temperatures better than conventional, prior art ACH solutions. In addition, since iron is not needed as a catalyst for the processes of making the ACHMH powder, commercially available lower iron raw materials can be used. Without any additional processing, the iron content of the solution will be less than 70 ppm as Fe.

These ACHMH powders are mostly insoluble in cold water and if added to warm water without the proper additional processes disclosed herein will turn into a solid gel. Another difficulty of putting these powders in solution is that they have a very low bulk density, e.g., as low as 0.3 gm/cm³ or lower. That means in order to make a concentrated solution over twice the volume of powder needs to be added to water. This is very difficult mechanically. One more challenge to putting these powders in solution is that once a solution of the high basicity ACH is made, it will turn into a solid gel within several days, making the ACH product useless.

Figure 8:
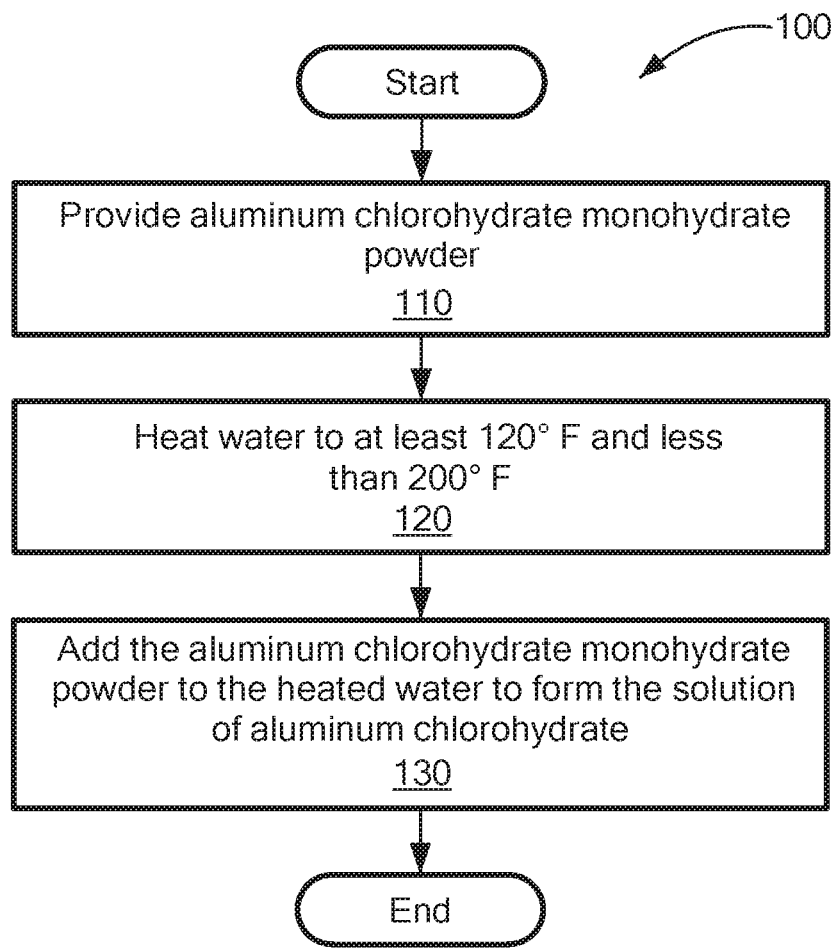
FIG. 8 shows a process of forming a solution of aluminum chlorohydrate from aluminum chlorohydrate monohydrate powder according to embodiments of the present invention.

FIG. 8 shows a process 100 for forming a lower basicity aluminum chlorohydrate solution from the ACHMH powders according to embodiments of the present invention. The process 100 begins by providing an ACHMH powder having a composition of:

$$Al_2(OH)_aCl_{(6-a)}\cdot XH_2O$$

where a=4.4 to 5 and X=0 to 1.7 in step 110. In step 120, water is heated to at least about 120° F. and less than about 200° F. The problem of putting a large volume of ACHMH powder into a small amount of liquid can be solved by starting with a base of ACH solution. As much or as little as practical may be used. For example, approximately 25% starting material may provide an adequate solution for solubilizing without an additional large capital expense for extra tankage. The ACH solution should be heated with all the water to above 150° F. to make the solution according to embodiments of the present invention. If desired, the water can be heated above 150° F. and added to the cooler ACH solution to allow the use of more economical materials of construction. Heat exchangers that can tolerate the corrosiveness of ACH are made of exotic metals or silicon carbide and are more expensive than those that simply heat water.

In step 130, the ACHMH powder is added to the heated solution and allowed to agitate until clear. The process of putting the ACHMH powder in solution is exothermic and may raise the temperature of the mixing tank up to 180° F. or above depending on the starting temperature of the solution. In another method, the ACHMH powder may be added in stages to prevent gelation. Up to half of the Aluminum chlorohydrate monohydrate (ACHMH) is added to all the water at above 120° F. and allowed to completely dissolve. The rest is added at several equal increments after each increment is incorporated. This process may take approximately 1 hour.

Figure 9:
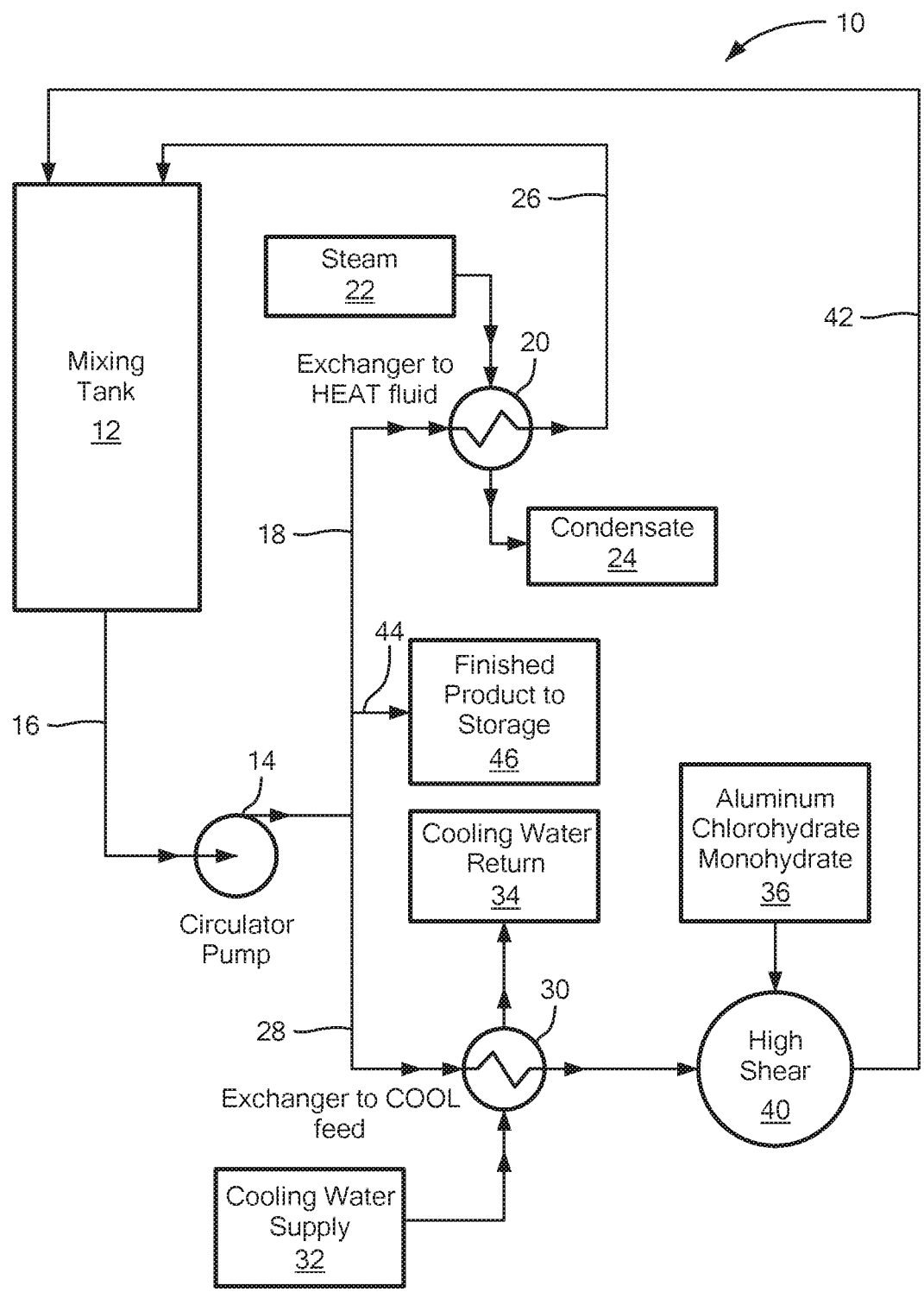
FIG. 9 schematically shows a mixing system for forming a solution of aluminum chlorohydrate from aluminum chlorohydrate monohydrate powder according to embodiments of the present invention.

FIG. 9 shows a mixing system 10, formed using a powder wetting and dispersion system, to form the aluminum chlorohydrate solution according to the process of FIG. 8. The mixing system 10 may include an agitated tank or mixing tank 12 for holding and mixing the liquids used and produced in the mixing system 10. When first in use, the mixing tank 12 may be initially loaded with ambient temperature water and then the water may be circulated, using circulator pump 14, along path 16 and path 18, through a heat exchanger 20 that heats the water to at least about 150° F. and less than the boiling temperature of the liquid, e.g., less than about 200° F. As known by one skilled in the art, steam 22 may be an input to the heat exchanger 20 and condensate 24 may be removed from the heat exchanger 20. The heated water then returns along path 26 to the mixing tank 12. The water may be circulated in the mixing system 10 in this manner until all of the water in the mixing tank 12 has been heated to the desired temperature.

The heated water may then be circulated along path 28, through an optional heat exchanger 30 that cools, and then introduced into a powder wetting and dispersion system 40. As known by one skilled in the art, the heat exchanger 30 may include a cooling water supply 32 as an input and a cooling water return 34 as an output. The heat exchanger 30 may be set with an exit temperature of ambient to about 140°

F., preferably between about 120° F. and about 130° F. The ACHMH powder may be held in a hopper 36 and gradually added to the powder wetting and dispersion system 40 along with the heated water to form a solution of aluminum chlorohydrate. The aluminum chlorohydrate solution is then returned back to the mixing tank 12 along path 42 where the aluminum chlorohydrate solution is mixed with the heated water. The heated solution is then circulated back through path 16 and path 28, through the heat exchanger 30 to the powder wetting and dispersion system 40 to be combined with the ACHMH powder and then the aluminum chlorohydrate solution is returned to the mixing tank 12 along path 42. Some of the heated solution from the mixing tank 12 may be circulated back along path 18 through the heat exchanger 20, along path 26 and back to the mixing tank 12 in order to keep the aluminum chlorohydrate solution at a desired temperature. The process continues until all the ACHMH powder is dispensed from the hopper 36 and added into the aluminum chlorohydrate solution. The aluminum chlorohydrate solution may then continue to circulate along path 16 and path 18, through heat exchanger 20, along path 26 and back to mixing tank 12 until the aluminum chlorohydrate solution is heated to at least about 150° F. and less than about 200° F. and forms a clear solution. The aluminum chlorohydrate solution may then be feed along path 44 and collected in a storage tank 46 for further use.

EXAMPLES

Example 1—Prior Art Method of Putting ACH Dihydrate into Solution

In order to produce a 23% aluminum oxide solution, 40 grams of aluminum chlorohydrate dihydrate at 48.2% $Al_2O_3$ and 83% basic was added to a beaker containing 37.1 milliliters of water at 73° F. The powder was added to the agitated solution of water. All the powder dissolved within 5 minutes and left a clear solution.

Example 2—Unsuccessful Effort at Putting ACH Monohydrate into Solution at 73° F.

In order to produce a 25% aluminum oxide solution, 32.2 grams of aluminum chlorohydrate monohydrate at 49.85% $Al_2O_3$ and 77% basic was added to a beaker containing 32 milliliters of water at 73° F. The aluminum chlorohydrate had a volume of approximately 100 milliliters, which is 3 times the volume of the water. The powder mixed with the water became a very viscous paste. Within 1 hour, the paste completely solidified, creating an unusable product.

Example 3—Unsuccessful Effort at Putting ACH Monohydrate into Solution at 73° F.

In order to produce a 25% aluminum oxide solution, 24 grams of aluminum chlorohydrate monohydrate at 56.6% $Al_2O_3$ and 83% basic was added to a beaker containing 35 milliliters of water at 73° F. The mixture became a solid mass, creating an unusable product.

Example 4—Unsuccessful Effort at Putting ACH Monohydrate into Solution at 176° F.

In order to produce a 25% aluminum oxide solution, 24 grams of aluminum chlorohydrate monohydrate at 56.6% $Al_2O_3$ and 83% basic was added to a beaker containing 35 milliliters of water at 176° F. The mixture became a solid mass, creating an unusable product.

Example 5—Unsuccessful Effort at Putting ACH Monohydrate into Solution at 170° F.

In order to produce a 25% aluminum oxide solution, 38.9 grams of aluminum chlorohydrate monohydrate at 49.1% $Al_2O_3$ and 75.8% basic was added to a stirred beaker containing 37.5 milliliters of water at 170° F. The powder mixed in well and formed a white homogeneous slurry. The solution was allowed to continuously stir and maintained at a temperature of 170° F. However, because all of the ACHMH powder was added to the water at one time, the slurry turned into a solid gel after 15 minutes, creating an unusable product.

Example 6—Unsuccessful Effort at Putting ACH Monohydrate into Solution at 176° F.

In order to produce a 23% aluminum oxide solution, 24 grams of aluminum chlorohydrate monohydrate at 56.6% $Al_2O_3$ and 83% basic was added to a beaker containing 60.6 milliliters of water at 176° F. After the solution cleared after 10 minutes, 6 more grams of the ACHMH was added. When the solution cleared again 5 minutes later, 6 more grams were added. This 6 gram addition was repeated twice more. A clear solution was produced. However, because the ACHMH powder was at 83% basic, the solution turned into a solid gel after 3 days, creating an unusable product.

Example 7—Successful Effort at Putting ACH Monohydrate into Solution According to Embodiments of the Present Invention In a 1,000 gallon tank equipped with an agitator that can produce a vortex, 630 gallons of water at 160° F. was agitated. Then 2375 pounds of ACHMH at 52.7% $Al_2O_3$ and 79.1% basic, having the formula of:

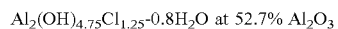

Figure 1:
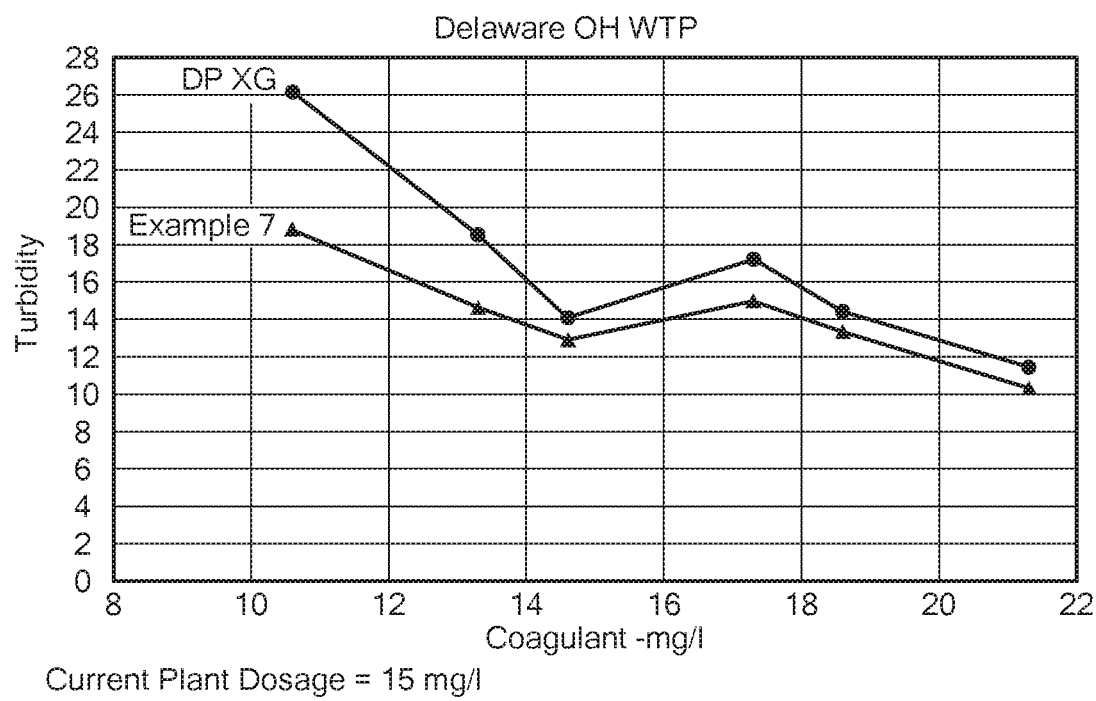
FIG. 1 is a graph of the turbidity vs. amount of coagulant for a prior art aluminum chlorohydrate solution and solution made according to Example 7.
Figure 2:
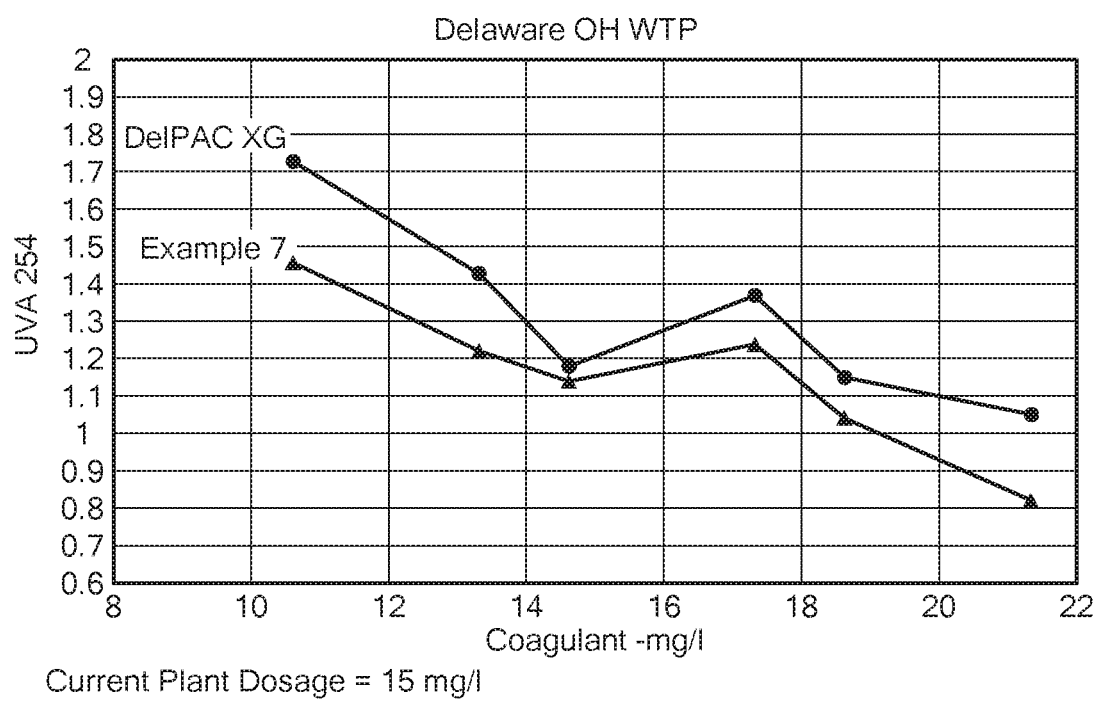
FIG. 2 is a graph of the ultraviolet light absorption vs. amount of coagulant for a prior art aluminum chlorohydrate solution and solution made according to Example 7.
Figure 3:
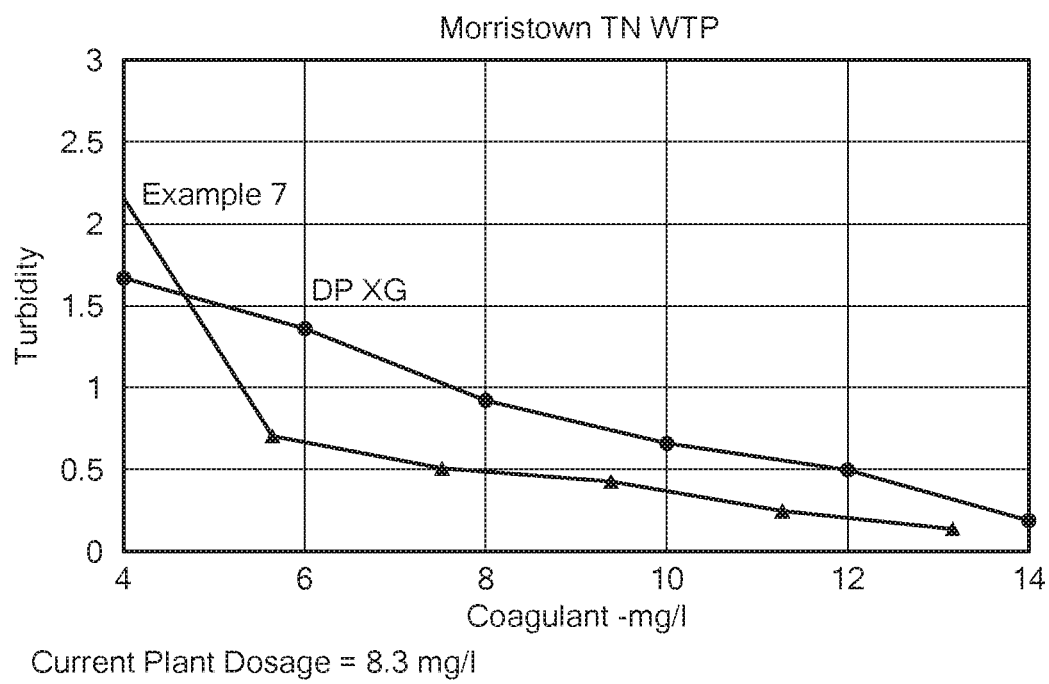
FIG. 3 is a graph of the turbidity vs. amount of coagulant for a prior art aluminum chlorohydrate solution and solution made according to Example 7.

$Al_2(OH)_{4.75}Cl_{1.25} \cdot 0.8H_2O$ at 52.7% $Al_2O_3$ was added to the tank. If a sufficient vortex is obtained, the dust is sucked from the air keeping the atmosphere relatively dust free. The solution was allowed to agitate until the powder was completely dissolved. Then approximately 594 lbs. of additional ACHMH was added into the vortex and again the solution was allowed to dissolve. This was repeated 3 more times and then the solution was allowed to clear. The slightly hazy solution after filtration produced a clear solution of 25% $Al_2O_3$ ACH and a basicity of 79%. This solution had a freezing point of 12° F. and an iron content of 40 ppm as Fe. The solution remained nonviscous and usable for over a year. FIGS. 1-3 are graphs showing the turbidity and ultraviolet light absorption versus the amount of coagulant for the solution made according to Example 7 compared to the prior art. Tables 1-3 below show the data for FIGS. 1-3, respectively.

TABLE 1

| Dosage mg/l | DP XG | Example 7 |
|---|---|---|
| 21.3 | 11.4 | 10.3 |
| 18.6 | 14.4 | 13.3 |
| 17.3 | 17.2 | 15 |
| 14.6 | 14.1 | 12.9 |
| 13.3 | 18.5 | 14.6 |
| 10.6 | 26.2 | 18.8 |

TABLE 2

| Dosage mg/l | DP XG | Example 7 |
|---|---|---|
| 21.3 | 1.05 | 0.82 |
| 18.6 | 1.15 | 1.04 |
| 17.3 | 1.37 | 1.24 |
| 14.6 | 1.18 | 1.14 |
| 13.3 | 1.43 | 1.22 |
| 10.6 | 1.73 | 1.46 |

TABLE 3

| Dosage mg/l | DP XG | Dosage mg/L | Example 7 |
|---|---|---|---|
| 14 | 0.189 | 13.16 | 0.138 |
| 12 | 0.495 | 11.28 | 0.246 |
| 10 | 0.66 | 9.38 | 0.428 |
| 8 | 0.922 | 7.52 | 0.504 |
| 6 | 1.36 | 5.64 | 0.704 |
| 4 | 1.67 | 3.76 | 2.37 |

Example 8—Successful Effort at Putting ACH Monohydrate into Solution According to Embodiments of the Present Invention In a 1,000 gallon agitated tank, 200 gallons of the solution of ACH produced in Example 7 was added. To this solution was added 400 gallons of water at 200° F. The temperature of the resulting solution (i.e., ACH solution and water) was 158° F. To this solution was added 3641 pounds of ACHMH at 52.7% $Al_2O_3$ and 79.1% basic, having the formula of:

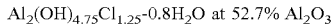

$Al_2(OH)_{4.75}Cl_{1.25}\text{-}0.8H_2O$ at 52.7% $Al_2O_3$

Figure 4:
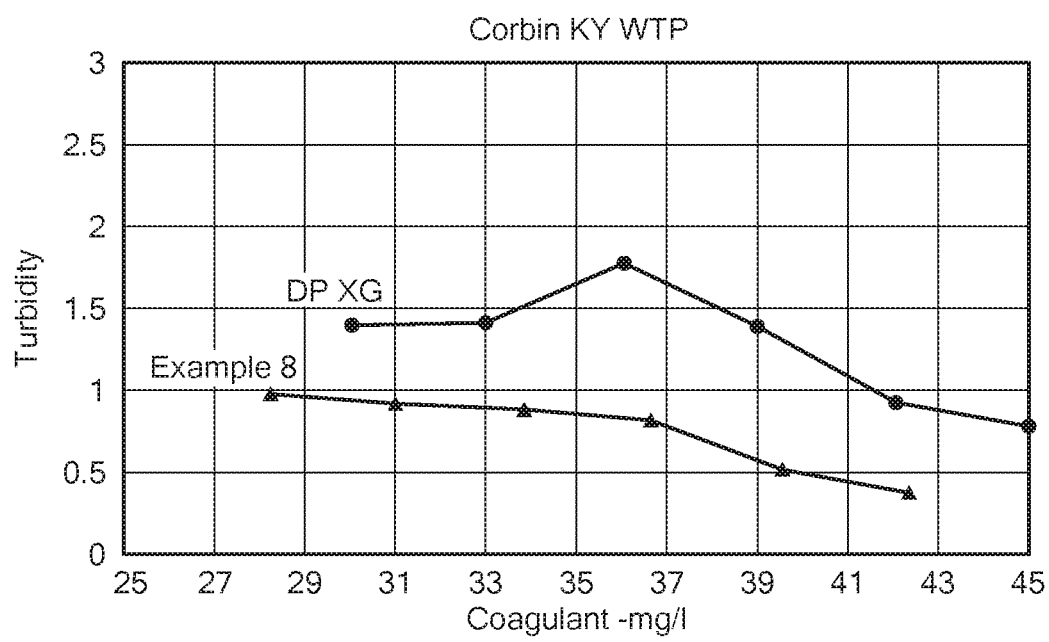
FIG. 4 is a graph of the turbidity vs. amount of coagulant for a prior art aluminum chlorohydrate solution and solution made according to Example 8.

The ACH powder is very dusty so that an induction line was used to vacuum the product into the tank. The tank was also equipped with a stack that contained water spray nozzles to prevent dust from spreading. The mixture was agitated for about an hour until a clear solution was obtained. This also produced a clear solution after filtration producing a solution of 25% $Al_2O_3$ and 79% basicity. The solution had a freezing point of 12° F. and an iron content of 32 ppm as Fe. The solution remained nonviscous and usable for over a year. FIG. 4 is a graph showing the turbidity versus the amount of coagulant for the solution made according to Example 8 compared to the prior art. Table 4 below shows the data for FIG. 4.

TABLE 4

| Dosage mg/l | DP XG | Dosage mg/L | Example 8 |
|---|---|---|---|
| 45 | 0.784 | 42.3 | 0.378 |
| 42 | 0.933 | 39.5 | 0.524 |
| 39 | 1.39 | 36.6 | 0.822 |
| 36 | 1.78 | 33.8 | 0.891 |
| 33 | 1.41 | 31 | 0.92 |
| 30 | 1.4 | 28.2 | 0.984 |

Example 9—Successful Effort at Putting ACH Monohydrate into Solution According to Embodiments of the Present Invention In order to produce a 25% aluminum oxide solution, 40 grams of ACHMH at 49.1% $Al_2O_3$ and 75.8% basic, having the formula of:

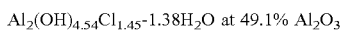

$Al_2(OH)_{4.54}Cl_{1.45}\text{-}1.38H_2O$ at 49.1% $Al_2O_3$ was added to a stirred beaker containing 77.2 milliliters of water at 150° F. The solution was allowed to continuously stir and was maintained at a temperature of 150° F. After 15 minutes, the solution cleared. To the solution, 10 more grams of the above ACHMH were added to the solution. After 10 minutes, the solution cleared. The 10 gram addition was repeated 3 more times, each time after the solution cleared. The solution remained nonviscous and clear for over a year. The solution had a freezing point of <10° F. and an iron content as Fe of 22 ppm.

Example 10—Successful Effort at Putting ACH Monohydrate into Solution According to Embodiments of the Present Invention In order to produce a 25% aluminum oxide solution, 31 grams of ACHMH at 55.2% $Al_2O_3$ and 82.0% basic, having the formula of:

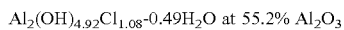

$Al_2(OH)_{4.92}Cl_{1.08}\text{-}0.49H_2O$ at 55.2% $Al_2O_3$ was added to a stirred beaker containing 74.9 milliliters of water at 200° F. The solution was allowed to continuously stir and no external heat was added to the solution. The beaker was allowed to cool naturally. Immediately after the addition, the temperature rose to 205° F. The addition of ACHMH to water is exothermic. After 15 minutes, the solution cleared and the temperature was 195° F. To the solution, 7.75 more grams of the above ACHMH were added to the solution. After 10 minutes, the solution cleared. The 7.75 gram addition was repeated 3 more times, each time after the solution cleared. The weight of the solution was 134.8 g, a concentration of 25.4% $Al_2O_3$ and a final temperature of 178° F. The solution remained nonviscous and clear for over a year. The solution had a freezing point of 22° F. and an iron content as Fe of 29 ppm.

Example 11—Successful Effort at Putting ACH Monohydrate into Solution According to Embodiments of the Present Invention In order to produce a 26.5% aluminum oxide solution, 50 grams of Example 10 at 178° F. was added to a beaker. To the beaker was added 36 milliliters of water at 210° F. This solution had a temperature of 190° F. To this solution was added 50 grams of ACHMH at 46.6% $Al_2O_3$ and 73.8% basic, having the formula of:

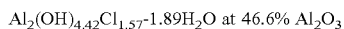

$Al_2(OH)_{4.42}Cl_{1.57}\text{-}1.89H_2O$ at 46.6% $Al_2O_3$

The solution was allowed to continuously stir and no external heat was added to the solution. The beaker was allowed to cool naturally. The final solution of 136 grams was composed of

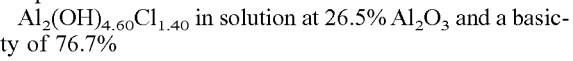

$Al_2(OH)_{4.60}Cl_{1.40}$ in solution at 26.5% $Al_2O_3$ and a basicity of 76.7%

The solution remained nonviscous and clear for over a year. The solution had a freezing point of 10° F. and an iron content as Fe of 43 ppm.

Example 12—Jar Testing

Jar Testing was performed comparing ACH produced by the standard commercial metal digesting process versus the ACH solution produced according to embodiments of the present invention by solutionizing ACHMH powder. The testing was done on raw waters from two municipalities in TN and KY using their respective jar testing techniques. The below results demonstrate better turbidity removal at the equivalent aluminum dosing for the ACH solution produced according to embodiments of the present invention.

Jar Testing Results from Morristown, Tenn. Water Treatment Plant (WTP)

DelPAC XG (ACH produced by commercial metal process)

TABLE 5

| PPM | Al | uL | pH | Turbidity |
|---|---|---|---|---|
| 4 | .497 | 6 | 7.26 | 1.67 |
| 6 | .746 | 9 | 7.30 | 1.36 |
| 8 | .994 | 12 | 7.36 | .922 |
| 10 | 1.24 | 15 | 7.41 | .660 |
| 12 | 1.492 | 18 | 7.46 | .495 |
| 14 | 1.740 | 21 | 7.44 | .189 |

ACH Produced According to Example 7

TABLE 6

| PPM | Al | uL | pH | Turbidity |
|---|---|---|---|---|
| 3.76 | .497 | 5 | 7.46 | 2.37 |
| 5.64 | .746 | 8 | 7.49 | .704 |
| 7.52 | .994 | 11 | 7.50 | .504 |
| 9.38 | 1.24 | 13 | 7.49 | .428 |
| 11.28 | 1.492 | 16 | 7.48 | .246 |
| 13.16 | 1.740 | 19 | 7.48 | .138 |

Jar Testing from Corbin, K.Y. Water Treatment Plant (WTP)

DelPAC XG (ACH Produced by Commercial Metal Process)

TABLE 7

| PPM | Al | uL | pH | Turbidity |
|---|---|---|---|---|
| 30 | 3.729 | 45 | 7.05 | 1.40 |
| 33 | 4.102 | 49 | 7.05 | 1.41 |
| 36 | 4.475 | 53 | 7.18 | 1.78 |
| 39 | 4.848 | 58 | 7.21 | 1.39 |
| 42 | 5.221 | 63 | 7.25 | 0.933 |
| 45 | 5.594 | 67 | 7.25 | 0.784 |

ACH Produced According to Example 8

TABLE 8

| PPM | Al | uL | pH | Turbidity |
|---|---|---|---|---|
| 28.2 | 3.729 | 41 | 7.24 | 0.984 |
| 31.0 | 4.102 | 45 | 7.21 | 0.920 |
| 33.8 | 4.475 | 49 | 7.21 | 0.891 |
| 36.6 | 4.848 | 53 | 7.19 | 0.822 |
| 39.5 | 5.221 | 57 | 7.22 | 0.524 |
| 42.3 | 5.594 | 61 | 7.22 | 0.378 |

Example 13—Unsuccessful Effort at Putting ACH Monohydrate into Solution Utilizing a Powder Wetting and Dispersion System 30 pounds of ACH monohydrate was placed in a feed hopper of a powder wetting and dispersion system. Water at 50-55° F. was set to run at 4 gallons per minute. After a third of the powder was fed into the system, the discharge of the system solidified stopping all flow. Shortly after, the receiving tank solidified as well. The whole system had to be disassembled and cleaned out.

Example 14—Successful Effort at Putting ACH Monohydrate into Solution Using a Powder Wetting and Dispersion System According to Embodiments of the Present Invention 630 gallons of ambient temperature water at 60° F. was added to a 1,000 gallon agitated tank. The water was circulated through a heating heat exchanger set at 170° F. and a slip stream flowed through a cooling heat exchanger and then into a powder wetting and dispersion system and back to the agitated tank. The exit temperature was set at 125° F. Initially the water was below 125° F. because the cooling heat exchanger does not have the ability to heat. The hopper of the powder wetting and dispersion system was filled 4,744 pounds of ACH monohydrate from Example 7. The valve to the hopper was partially opened to allow the powder to gradually mix into the heated solution. The powder was allowed to flow at about 20 pounds per minute. After about 4 hours the addition was complete. The solution was allowed to continue through the heating heat exchanger until the temperature was 165° F. This produced 860 gallons of a clear nonviscous solution of 25% $Al_2O_3$ and 79.1% basic.

Although the above discussion discloses various exemplary embodiments of the invention, it should be apparent that those skilled in the art may make various modifications that will achieve some of the advantages of the invention without departing from the scope of the invention.

What is claimed is:

1. A method of forming a solution of aluminum chlorohydrate the method comprising:
   providing aluminum chlorohydrate monohydrate powder having a composition of $$Al_2(OH)_aCl_{(6-a)}\text{---}XH_2O$$

where
   a=4.4 to 5 and X=0 to 1.7;
   heating water to at least 120° F. and less than 200° F.; and
   dissolving at least a portion of the aluminum chlorohydrate monohydrate powder into the heated water to form the solution of aluminum chlorohydrate wherein the solution remains gel-free.

2. The method of claim 1, further comprising dissolving another portion of the aluminum chlorohydrate monohydrate powder into the solution.

3. The method of claim 2, wherein dissolving the another portion includes agitating the aluminum chlorohydrate monohydrate powder and the heated water until the solution is clear.

4. The method of claim 1, wherein dissolving the portion includes agitating the aluminum chlorohydrate monohydrate powder and the heated water until the solution is clear.

5. The method of claim 1, further comprising:
   mixing the solution of aluminum chlorohydrate with a second amount of water to form a second solution of aluminum chlorohydrate;
   heating the second solution to at least 150° F. and less than 200° F.; and
   dissolving an additional amount of the aluminum chlorohydrate monohydrate powder in the second solution.

6. The method of claim 5, wherein heating the second solution to at least 150° F. and less than 200° F. includes heating the second amount of water to a temperature sufficiently above 150° F., so that adding the heated second amount of water to the solution of aluminum chlorohydrate causes the temperature of the second solution to be between about 150° F. and about 200° F.

7. The method of claim 5, wherein the second solution includes an aluminum oxide concentration greater than 24 wt % and less than 27 wt %.

8. The method of claim 5, wherein the second solution includes an aluminum oxide concentration greater than 18 wt % and less than 27 wt %.

9. The method of claim 5, wherein the second solution has a basicity greater than 74% and less than 83%.

10. The method of claim 1, wherein the solution includes an aluminum oxide concentration greater than 24 wt % and less than 27 wt %.

11. The method of claim 1, wherein the solution includes an aluminum oxide concentration greater than 18 wt % and less than 27 wt %.

12. The method of claim 1, wherein the solution has a basicity greater than 74% and less than 83%.

13. The method of claim 1, wherein the solution has a freezing point ranging from about 10° F. to about 16° F.

14. The method of claim 1, wherein the solution has an iron content of less than 70 ppm as Fe.

15. A product produced by the method of claim 1.

16. A solution of aluminum chlorohydrate made from chlorohydrate monohydrate powder having a composition of $Al_2(OH)_a Cl_{(6-a)}$—$XH_2O$ where a=4.4 to 5 and X=0 to 1.7, the solution comprising:
an aluminum oxide concentration ranging from about 18 wt % to about 27 wt %, wherein the solution has a basicity ranging from greater than 74% and less than 83%, and a freezing point ranging from about 10° F. to about 16° F.

17. The solution of claim 16, wherein the aluminum oxide concentration ranges from about 24 wt % to about 27 wt %.

18. The solution of claim 16, wherein the solution has an iron content of less than 70 ppm as Fe.

* * * * *